US008371412B2

(12) United States Patent
Sato

(10) Patent No.: US 8,371,412 B2
(45) Date of Patent: Feb. 12, 2013

(54) GEAR-SHIFT CONTROLLING APPARATUS OF SADDLE-RIDING TYPE VEHICLE

(75) Inventor: Tomoyasu Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 12/685,316

(22) Filed: Jan. 11, 2010

(65) Prior Publication Data

US 2010/0212448 A1 Aug. 26, 2010

(30) Foreign Application Priority Data

Feb. 26, 2009 (JP) ................................ 2009-044807

(51) Int. Cl.
*F16H 59/04* (2006.01)
*G05G 1/30* (2008.04)

(52) U.S. Cl. ...................... 180/230; 74/473.16; 180/219

(58) Field of Classification Search .................. 180/219, 180/230, 336; 74/473.12, 473.16
See application file for complete search history.

(56) References Cited

U.S. PATENT DOCUMENTS

2007/0251747 A1* 11/2007 Kosugi ......................... 180/230
2008/0125285 A1* 5/2008 Takeuchi ........................ 477/79
2008/0149409 A1* 6/2008 Watanabe et al. ............. 180/219
2008/0188350 A1* 8/2008 Kojima et al. ................. 477/97

FOREIGN PATENT DOCUMENTS

JP 2001-50389 A 2/2001
JP 2008-262233 A 10/2008

* cited by examiner

*Primary Examiner* — Anne Marie M Boehler

(74) *Attorney, Agent, or Firm* — Birch, Stewart, Kolasch & Birch, LLP

(57) ABSTRACT

A saddle riding type vehicle includes a sensor that generates a signal, a moving member that moves a movable portion of the sensor and a coupling member that couples the moving member to a change pedal. The change pedal, the coupling member, the moving member and the sensor are arranged sequentially alongside one another along a sub-frame. The sub-frame is an existing member constituting a part of a vehicle body frame. Thus, base plates dedicated to the moving member, the sensor and the like can be eliminated.

17 Claims, 16 Drawing Sheets

14
25
55
105
104
106
57
59
107
71 72 73
70

GEAR-SHIFT CONTROLLING APPARATUS OF SADDLE-RIDING TYPE VEHICLE

CROSS-REFERENCE TO RELATED APPLICATIONS

The present application claims priority under 35 USC 119 to Japanese Patent Application No. 2009-044807 filed on Feb. 26, 2009 the entire contents of which are hereby incorporated by reference.

BACKGROUND OF THE INVENTION

1. Field of the Invention

The present invention relates to an improvement of a gear-shift controlling apparatus of a saddle riding type vehicle represented by a motorcycle.

2. Description of Background Art

A motorcycle is known that is provided with a motor-driven transmission in which a command for shifting the motor-driven transmission is given by a foot operation with a change pedal. See, for example, Japanese Patent Application Publication No. 2001-050389 (FIGS. 6 and 1).

A specific example of a gear change pedal mechanism capable of providing such a gear-shift in Japanese Patent Application Publication No. 2008-262233 (FIG. 5).

FIG. 5 of Japanese Patent Application Publication No. 2008-262233 shows an apparatus in which components such as the step (124), the gear change pedal (18) and the click generating mechanism (150) are collectively attached to the attachment plate (122b).

All of the above components extend in a vehicle-width direction, and therefore affect the vehicle width.

However, size reduction in a vehicle-width direction is required for a certain type of the motorcycle.

SUMMARY AND OBJECTS OF THE INVENTION

An object of an embodiment of the present invention is to provide a technology capable of preventing an increase in vehicle width in a saddle riding type vehicle.

According to an embodiment of the present invention, a gear-shift controlling apparatus of a saddle riding type vehicle for controlling a transmission is provided for an engine attached to a vehicle body frame of the saddle riding type vehicle. The gear-shift controlling apparatus includes a detection mechanism for detecting an operation of a change pedal, and a gear-shift mechanism that shifts the transmission on the basis of a signal received from the detection mechanism. The detection mechanism includes a sensor for generating the signal, a moving member that makes a movable portion of the sensor movable, and a coupling member that couples the moving member to the change pedal. The change pedal, the coupling member, the moving member and the sensor are arranged sequentially alongside one another along a member constituting the vehicle body frame.

According to an embodiment of the present invention, a gear-shift controlling apparatus of a saddle riding type vehicle for controlling a transmission provided to an engine attached to a main frame and a sub-frame constituting a vehicle body frame of the saddle riding type vehicle. The gear-shift controlling apparatus includes a detection mechanism that detects an operation of a change pedal, and a gear-shift mechanism that shifts the transmission on the basis of a signal received from the detection mechanism. The detection mechanism includes a sensor that generates the signal, a moving member that makes a movable portion of the sensor movable, and a coupling member that couples the moving member to the change pedal. The change pedal, the coupling member, the moving member and the sensor are arranged alongside one another in a longitudinal direction of the sub-frame.

According to an embodiment of the present invention, the moving member is movably attached to the sub-frame.

According to an embodiment of the present invention, the moving member includes an arm member that swings about one end thereof, while a pivotally supporting portion of the arm member is formed integrally with the sub-frame.

According to an embodiment of the present invention, wherein a rotary shaft is attached to the sub-frame with a bearing interposed therebetween. One end of the rotary shaft projects from the sub-frame toward an outside of the vehicle, the arm member is attached to the projected one end, the other end of the rotary shaft projects from the sub-frame toward the center of the vehicle, and the sensor is attached to the projected other end.

According to an embodiment of the present invention, the vehicle body frame includes a head pipe, a main frame extending rearward from the head pipe, and a pivot plate extending from a rear portion of the main frame and supporting a front end of a rear swing arm supporting a rear wheel, and a lower frame serving as the sub-frame extends from the pivot table toward the front of the vehicle.

According to an embodiment of the present invention, a gear-shift controlling apparatus of a saddle riding type vehicle is provided for controlling a transmission of an engine provided to the saddle riding type vehicle, the gear-shift controlling apparatus comprising a detection mechanism for detecting an operation of a change pedal, and a gear-shift mechanism that shifts the transmission on the basis of a signal received from the detection mechanism. The detection mechanism includes a sensor that generates the signal, a moving member that makes a movable portion of the sensor movable, and a coupling member that couples the moving member to the change pedal, and the change pedal, the coupling member, the moving member and the sensor are arranged, under the engine, alongside one another in a front-rear direction of the vehicle.

According to an embodiment of the present invention, the engine includes a crankcase arranged at the center in the vehicle-width direction, and cylinders projecting from the crankcase leftward and rightward in the vehicle-width direction, and the change pedal, the coupling member, the moving member and the sensor are arranged, under the cylinders, alongside one another along the crankcase in the front-rear direction of the vehicle.

According to an embodiment of the present invention, exhaust pipes connected to lower faces of the cylinders extend downward in an outside of the detection mechanism in the vehicle-width direction.

According to an embodiment of the present invention, the change pedal is supported by the engine.

According to an embodiment of the present invention, the change pedal is supported by a side stand bracket to which a side stand is attached.

According to an embodiment of the present invention, the sensor is a non-contact switch.

According to an embodiment of the present invention, a gear-shift a apparatus of a saddle riding type vehicle for controlling a transmission of an engine is provided for the saddle riding type vehicle. The gear-shift controlling apparatus includes a detection mechanism for detecting an operation of a change pedal; and a gear-shift mechanism that shifts the transmission on the basis of a signal received from the detection mechanism. The detection mechanism includes a sensor for generating the signal, a moving member that moves a movable portion of the sensor, and a coupling member that couples the moving member to the change pedal. The change pedal, the coupling member, the moving member and the sensor are arranged sequentially alongside one another, and the sensor is arranged closer to the gear-shift mechanism than the change pedal is.

According to an embodiment of the present invention, the change pedal, the coupling member, the moving member and the sensor are arranged sequentially alongside one another along a member constituting the vehicle body frame. Since the member constituting the vehicle body frame is utilized, base plates exclusively for the moving member, the sensor and the like can be eliminated. As a result, a procurement cost and an attachment cost for members can be easily reduced.

In addition, by having the components arranged along the member constituting the vehicle body frame, length reduction of the coupling member is made possible while the size in the vehicle-width direction can be reduced.

According to an embodiment of the present invention, the change pedal, the coupling member, the moving member and the sensor are arranged alongside one another in a longitudinal direction of the sub-frame. The sub-frame is an existing member constituting a part of the vehicle body frame. In other words, base plates exclusively for the moving member, the sensor and the like can be eliminated. As a result, a procurement cost and an attachment cost for members can be easily reduced.

In addition, by having the components arranged along the sub-frame, the length reduction of the coupling member is made possible while the size in the vehicle-width direction can be reduced.

According to an embodiment of the present invention, the moving member is movably attached to the sub-frame. Thus, base plates exclusive for the moving member and the like can be eliminated. As a result, a procurement cost and an attachment cost for members can be easily reduced.

According to an embodiment of the present invention, the moving member includes an arm member that swings about one end thereof, while a pivotally supporting portion of the arm member is formed integrally with the sub-frame. Thus, base plates exclusively for the moving member and the like can be eliminated. As a result, a procurement cost and an attachment cost for members can be easily reduced.

According to an embodiment of the present invention, a rotary shaft is attached to the sub-frame through a bearing, the other end of the rotary shaft projects from the sub-frame toward the center of the vehicle, and the sensor is attached to the projected other end.

The sensor is arranged to the vehicle-center side of the sub-frame. That is, since the sensor is protected by the sub-frame, it becomes unnecessary to additionally provide a protective cover.

According to an embodiment of the present invention, the vehicle body frame includes a head pipe, a main frame extending rearward from the head pipe, and a pivot plate extending from a rear portion of the main frame and supporting a front end of a rear swing arm supporting a rear wheel. A lower frame serves as the sub-frame extends frontward of the vehicle, from the pivot table.

The existing lower frame can be utilized, and thus exclusive base plates can be eliminated. As a result, a procurement cost and an attachment cost for members can be easily reduced.

According to an embodiment of the present invention, the change pedal, the coupling member, the moving member and the sensor are arranged under the engine and alongside one another in a front-rear direction of the vehicle, whereby a vacant space under the engine can be effectively utilized.

According to an embodiment of the present invention, the change pedal, the coupling member, the moving member and the sensor are arranged, under the cylinders and along the crankcase, alongside one another in the front-rear direction of the vehicle, whereby a dead space under the cylinders can be effectively utilized.

According to an embodiment of the present invention, exhaust pipes connected to lower faces of the cylinders extend downward to an outer side of the detection mechanism in the vehicle-width direction. The exhaust pipes exist on the outer side of the detection mechanism. The exhaust pipes exert a function of protecting the detection mechanism.

According to an embodiment of the present invention, the change pedal is supported, neither by the sub-frame nor by the lower frame, but by the engine. When the lower frame is provided, a load on the lower frame can be reduced, and size reduction and weight reduction of the lower frame are made possible.

Furthermore, by being supported by the engine, the change pedal can be provided in the same position as in the case of a manual transmission vehicle.

According to an embodiment of the present invention, the change pedal is supported, neither by the sub-frame nor by the lower frame, but by a side stand bracket. When the lower frame is provided, a load on the lower frame can be reduced, and size reduction and weight reduction of the lower frame are made possible.

In addition, since a side stand bracket is an existing member, an increase in number of members can be suppressed.

According to an embodiment of the present invention, the sensor is configured as a non-contact switch. A contact switch requires the consideration of the wearing of a contacted position thereof. In this regard, a non-contact switch is in no danger of wearing.

According to an embodiment of the present invention, the change pedal, the coupling member, the moving member and the sensor are arranged sequentially alongside one another, while the sensor is arranged closer to the gear-shift mechanism than the change pedal is arranged. Thus, the distance between the sensor and the gear-shift mechanism is shortened. As a result, a harness extending from a controller can integrally extend even to the sensor and to the gear-shift mechanism, whereby the harness can be shortened while an attachment cost of the harness can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
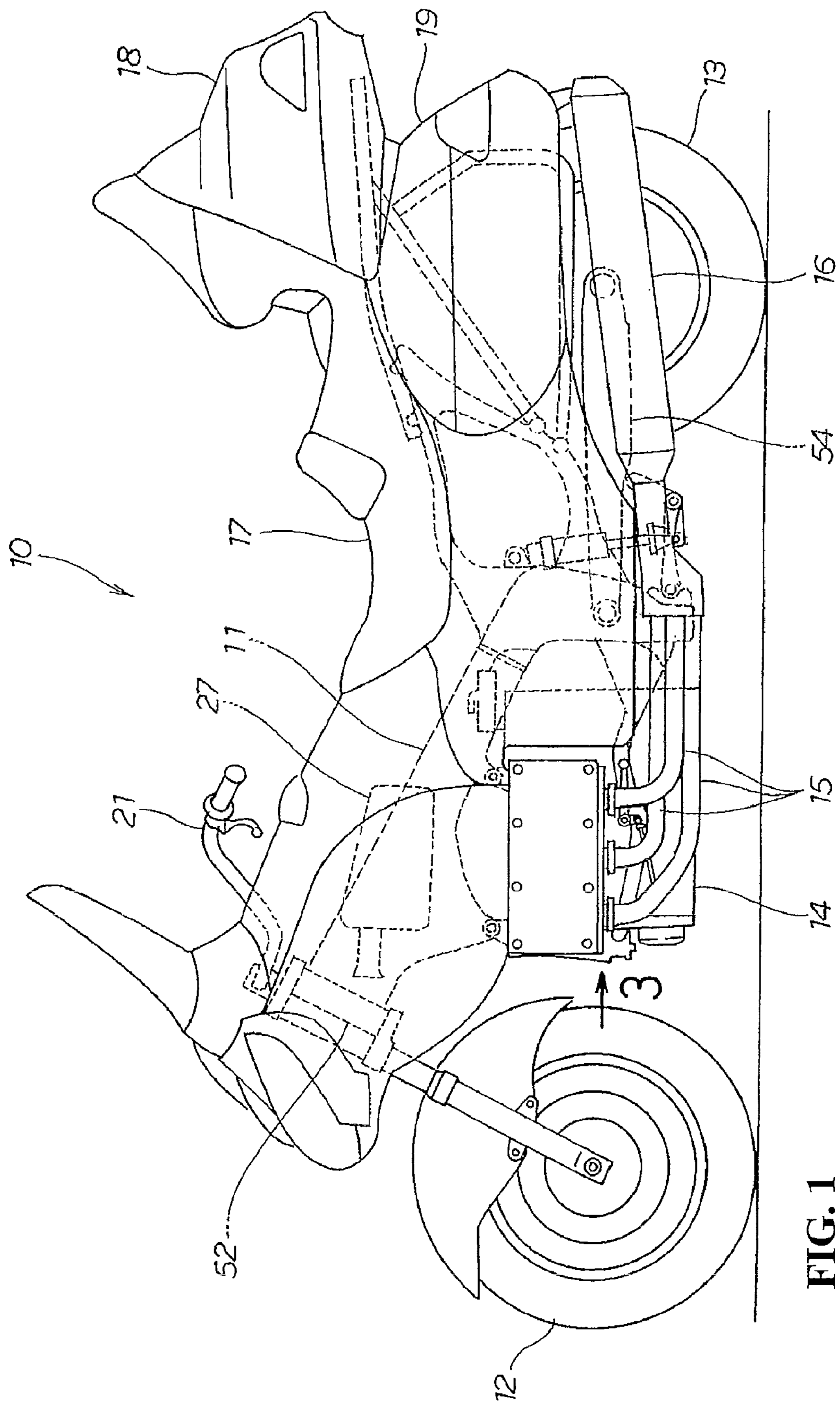
FIG. 1 is a left-side view of a saddle riding type vehicle.

Embodiments of the present invention are described below based on the accompanying drawings. The drawings are viewed in directions indicated by reference numerals.

A saddle riding type vehicle is a collective term of any one of vehicles, which include a motorcycle, a three-wheeled buggy, a four-wheeled buggy and the like, each taking a form in which a driver sits on a seat and straddles to place his or her feet on left and right steps.

In the following description, a saddle riding type vehicle is described with a motorcycle taken as an example thereof.

Although a member constituting a vehicle body frame is described with a sub-frame taken as an example thereof, the member constituting the vehicle body frame is not limited to the sub-frame. Furthermore, although the sub-frame is described with a lower frame taken as an example thereof, the sub-frame is not limited to the lower frame.

As shown in FIG. 1, a first example of the present invention is directed to a motorcycle 10, as a saddle riding type vehicle, includes a front wheel 12 and a rear wheel 13 in the front and in the rear of a vehicle body frame 11. An engine 14 is positioned under the vehicle body frame 11 with exhaust pipes 15 extending downward from the engine 14 and extending rearward of the vehicle. A muffler 16 is positioned at the rear ends of the exhaust pipes 15. A tandem seat 17 in an upper part of the vehicle body frame 11 includes a storage area in the rear of the tandem seat. The storage is composed of a rear case 18 and a side case 19 which can be used with a driver sitting on the seat 17 and gripping a handle 21.

Figure 2:
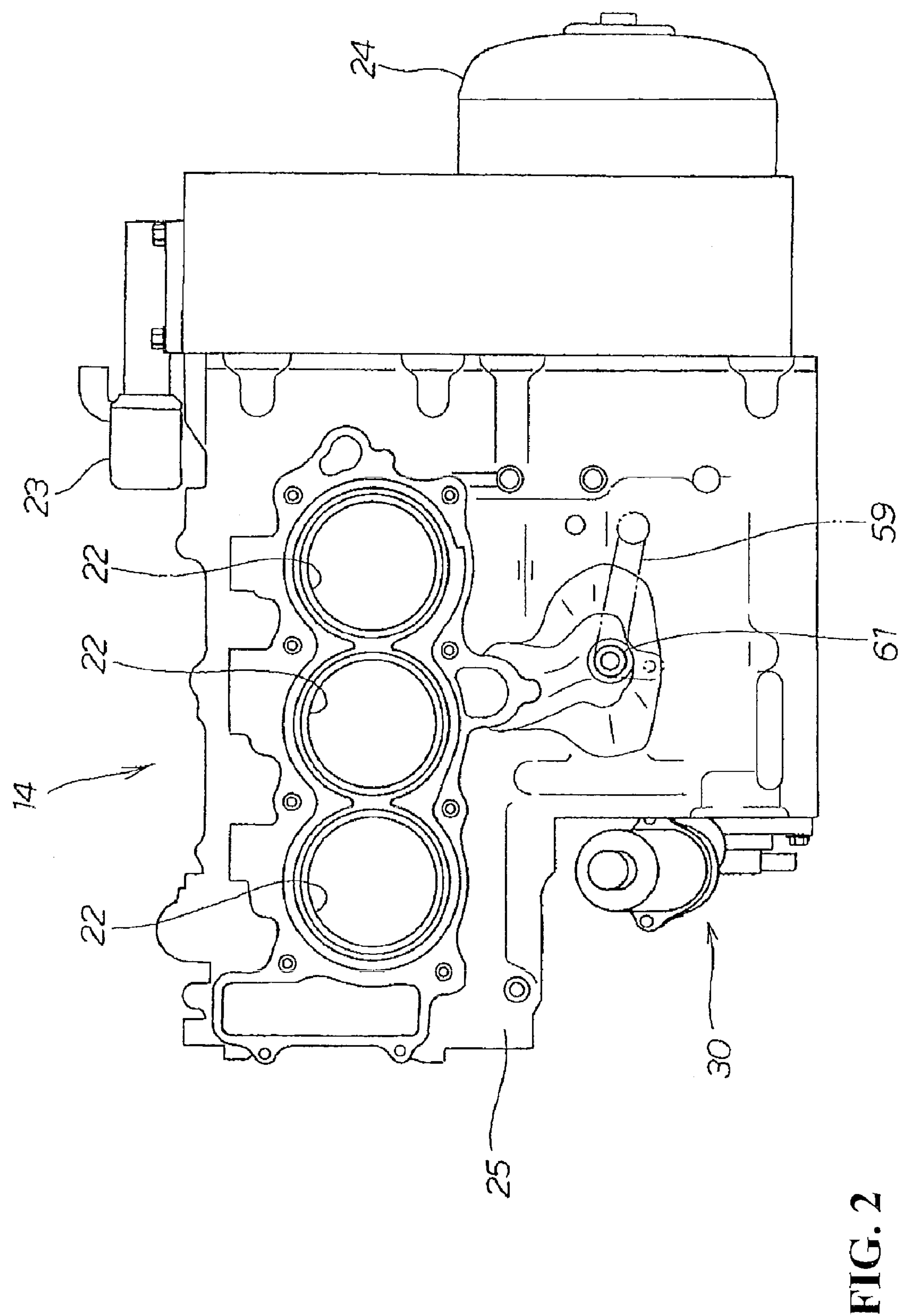
FIG. 2 is a left-side view of an engine.

As shown in FIG. 2, the engine 14 is a multi-cylinder engine having a plurality of cylinders 22 arrayed in a front-rear direction of the vehicle (a left-right direction in the drawing). An actuator 23 is provided in an upper part thereof. A clutch 24 is arranged in a rear part thereof with a gear-shift mechanism 30 arranged in a front part thereof.

Figure 3:
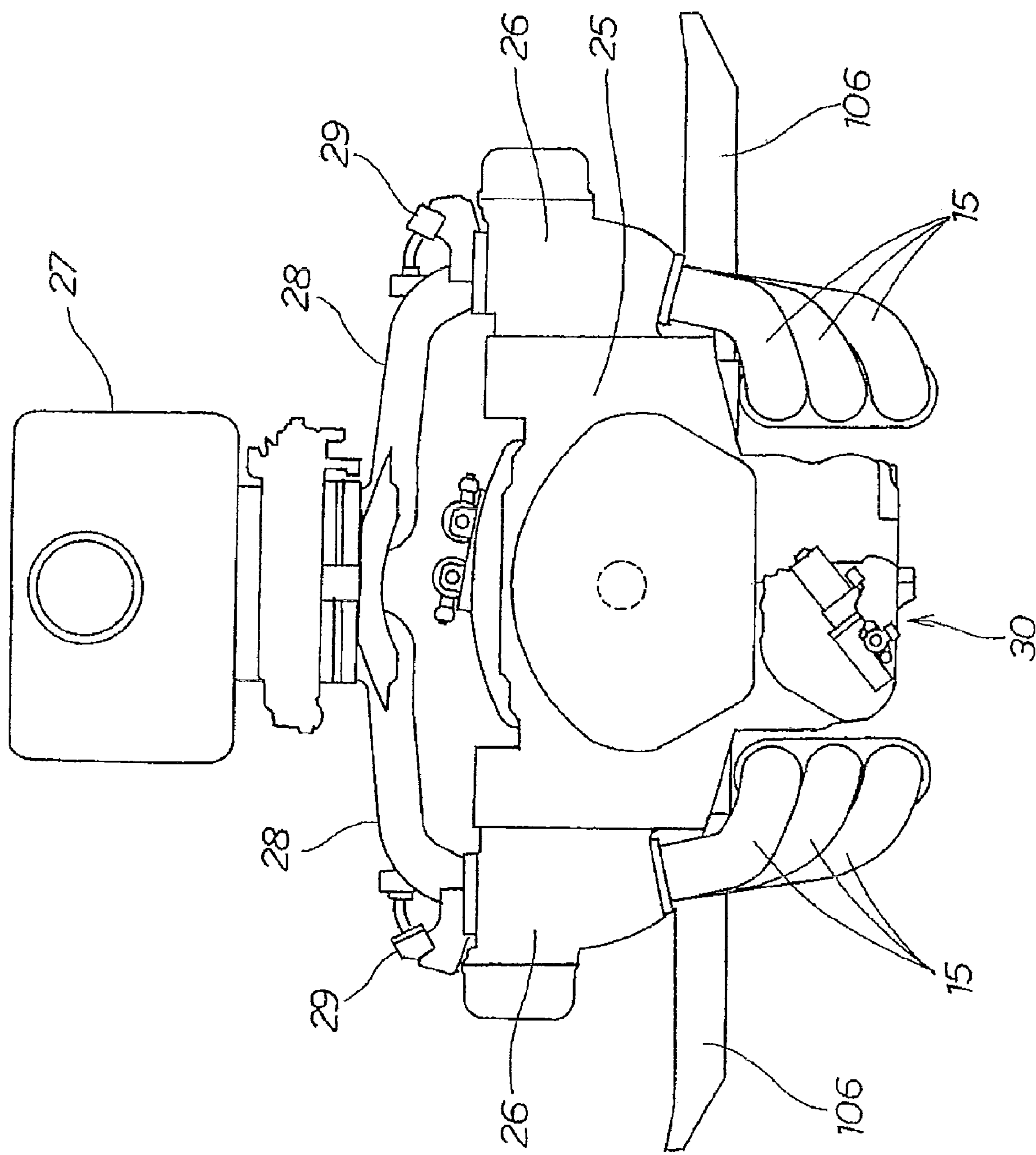
FIG. 3 is a view as seen in a direction indicated by an arrow 3 in FIG. 1.

As shown in FIG. 3, when being viewed from the front side of the vehicle, the engine 14 includes a crankcase 25 arranged at the center in the vehicle-width direction, cylinders 22, as illustrated in FIG. 2, project from the crankcase 25 leftward and rightward in the vehicle-width direction, and cylinder heads 26, 26 are set for covering the cylinders. Combustion air is supplied from an air cleaner 27 to these cylinder heads 26, 26 via induction pipes 28, 28 with appropriate amounts of fuel being mixed into the combustion air through fuel injection valves 29, 29.

The exhaust pipes 15, which release exhaust gas produced after combustion, extend downward from the cylinder heads 26 and then extend toward the back of the drawing. The gear-shift mechanism 30 provided to a front side of the crankcase 25 is described in detail in connection with the next drawing.

Figure 4:
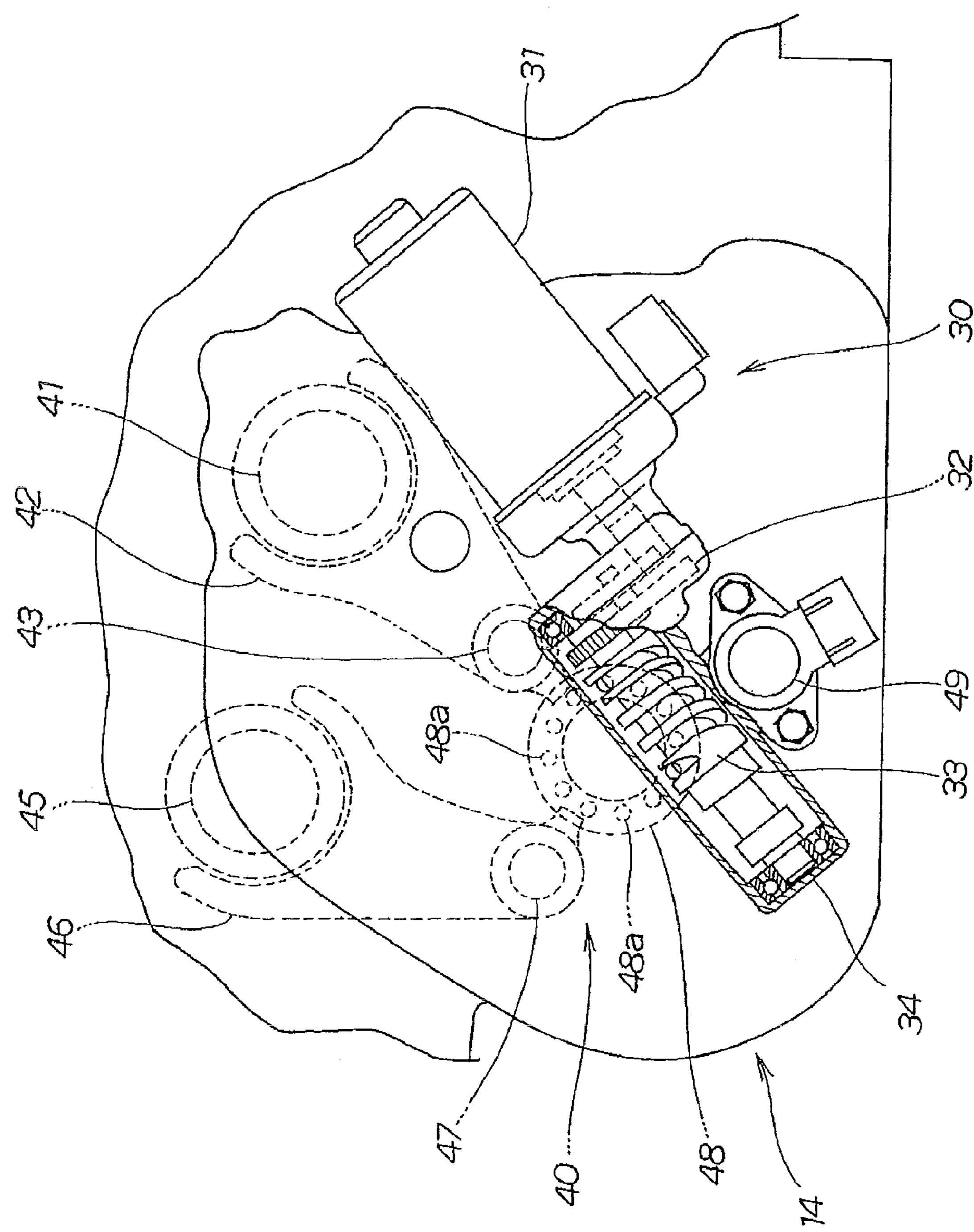
FIG. 4 is a front view of a gear-shift mechanism.

As shown in FIG. 4, the gear-shift mechanism 30 is an electric actuator composed of an electric motor 31, a screw 33 that is rotated by the electric motor 31 via a gear set 32, and a housing 34 that rotatably stores the screw 33.

In addition, a transmission 40 built-in inside or attached to the engine 14 includes a main shaft 41 supporting a mission gear. A first shift folk 42 moves the mission gear in a direction in which a shaft of the main shaft 41 extends with a first shift shaft 43 movably supporting the first shift folk 42 and a counter shaft 45 arranged in parallel with the main shaft 41 and supporting a counter gear. A second shift folk 46 moves the counter gear in a direction in which a shaft of the counter shaft 45 extends with a second shift shaft 47 movably supporting the second shift folk 46 and a pin-attached drum 48 that moves the first and second shift folks 42 and 46.

When the screw 33 of the electric actuator is rotated by the electric motor 31, pins 48*a* fitted to a groove of the screw 33 are guided by the groove, and the pin-attached drum 48 starts to rotate. As a result, the first and second shift folks 42 and 46 move, and a predetermined gear-shift operation is carried out. A status of the shifting is detected by a shift sensor 49.

Next, the vehicle body frame 11 is described in detail.

Figure 5:
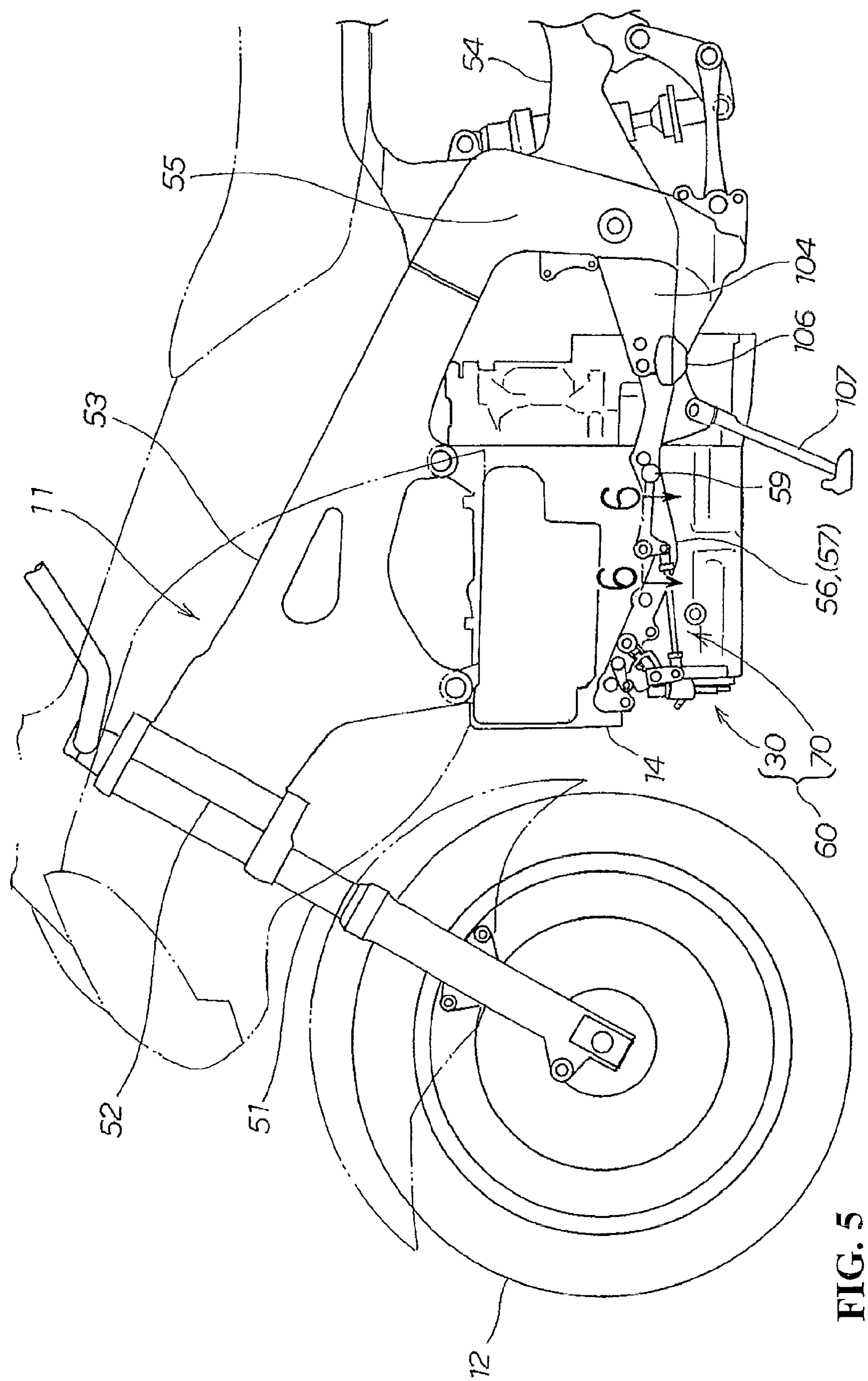
FIG. 5 is a cross-sectional view illustrating a configuration of a vehicle body frame.

In FIG. 5, the vehicle body frame 11 includes a head pipe 52 supported by a front folk 51 provided to the front wheel 12 with a main frame 53 extending from the head pipe 52 rearward of the vehicle and obliquely downward. A pivot plate 55 is provided to the rear end of the main frame 53 and supports a front end of a rear swing arm 54. A lower frame 57 serves as a sub-frame 56 and extends frontward of the vehicle from a lower part of the pivot plate 55 and supports a lower part of the engine 14.

More specifically, the main frame 53 and the sub-frame 56 that support the engine 14 are included in the vehicle body frame 11. Since the sub-frame 56 needs only to be a member that supports the engine in cooperation with the main frame 53, an existing member referred to as a hanger bracket or the like is sufficient therefore. Thus, the sub-frame 56 is not limited to the lower frame 57. In addition, the sub-frame 56 may be detachably attached to the main frame 53 as in the case of this example, or may otherwise be undetachably attached by integral formation or by welding.

Although not being limited to the lower frame 57, the sub-frame 56 is described below with the lower frame 57 taken as a specific example thereof.

Figure 6:
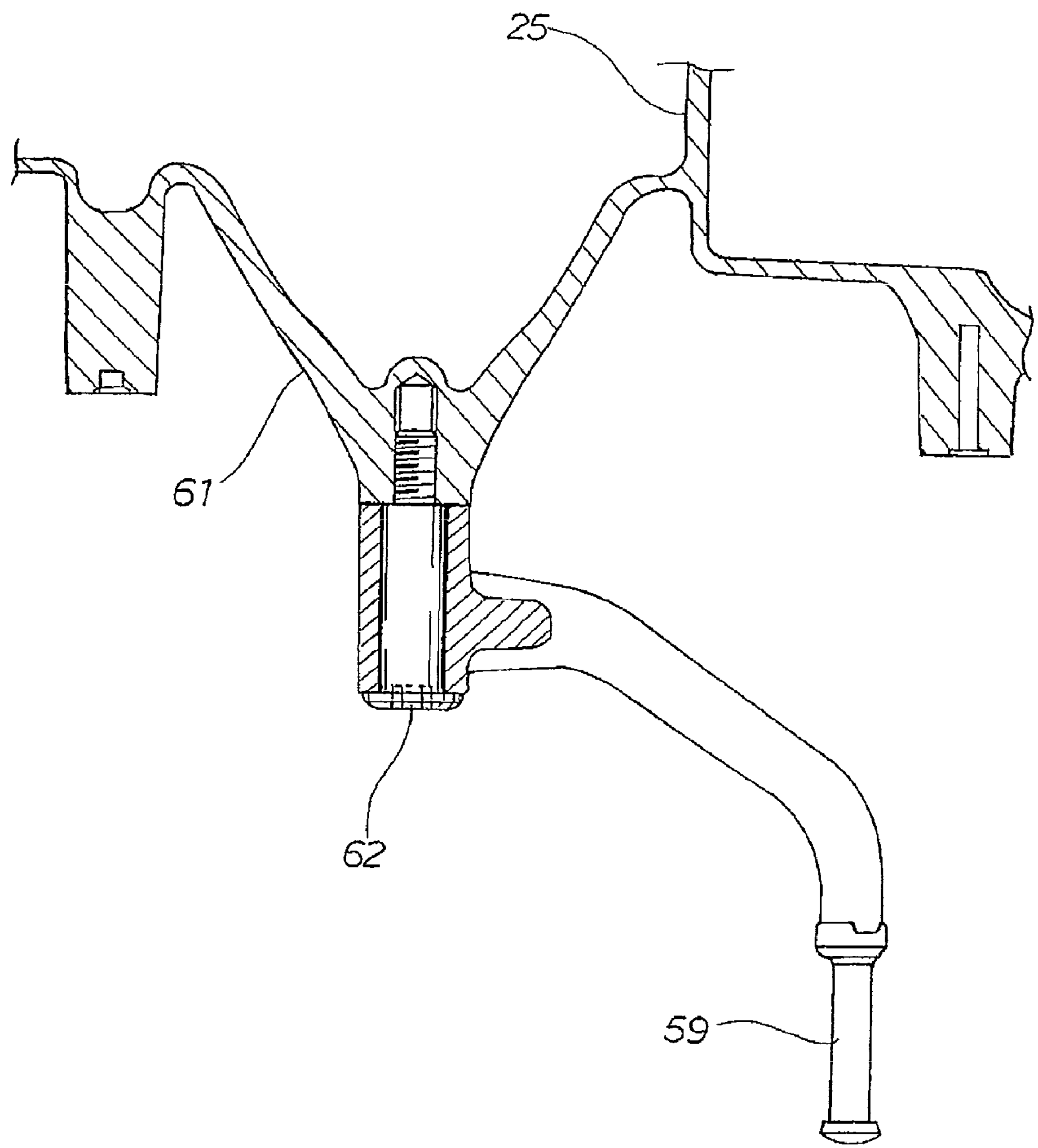
FIG. 6 is a view taken along a 6-6 line in FIG. 5.

For example, as shown in FIG. 6, with a conically-shaped or ribbed boss 61 projecting from the crankcase 25 of the engine, a change pedal 59 is swingably attached to the boss 61 through a bolt 62. The change pedal 59 is supported neither by the sub-frame nor by the lower frame but by the engine. As compared to, for example, a case where the change pedal 59 is provided to the lower frame, a load on the lower frame can be reduced. Thus, size reduction and weight reduction of the lower frame are made possible.

Furthermore, as supported by the engine, the change pedal can be provided in the same position as in the case of a manual transmission vehicle.

As illustrated in FIG. 5, a saddle riding type vehicle includes the engine 14 attached to the main frame 53 and the sub-frame 56 constituting the vehicle body frame 11 that controls the transmission 40, as illustrated in FIG. 4, that is attached to the above described engine 14. Here, the vehicle includes a gear-shift controlling apparatus 60 composed of a detection mechanism 70 for detecting an operation of the change pedal 59 and the gear-shift mechanism 30 that shifts the transmission on the basis of a signal from the detection mechanism 30. Details of the detection mechanism 70 are described later.

Figure 7:
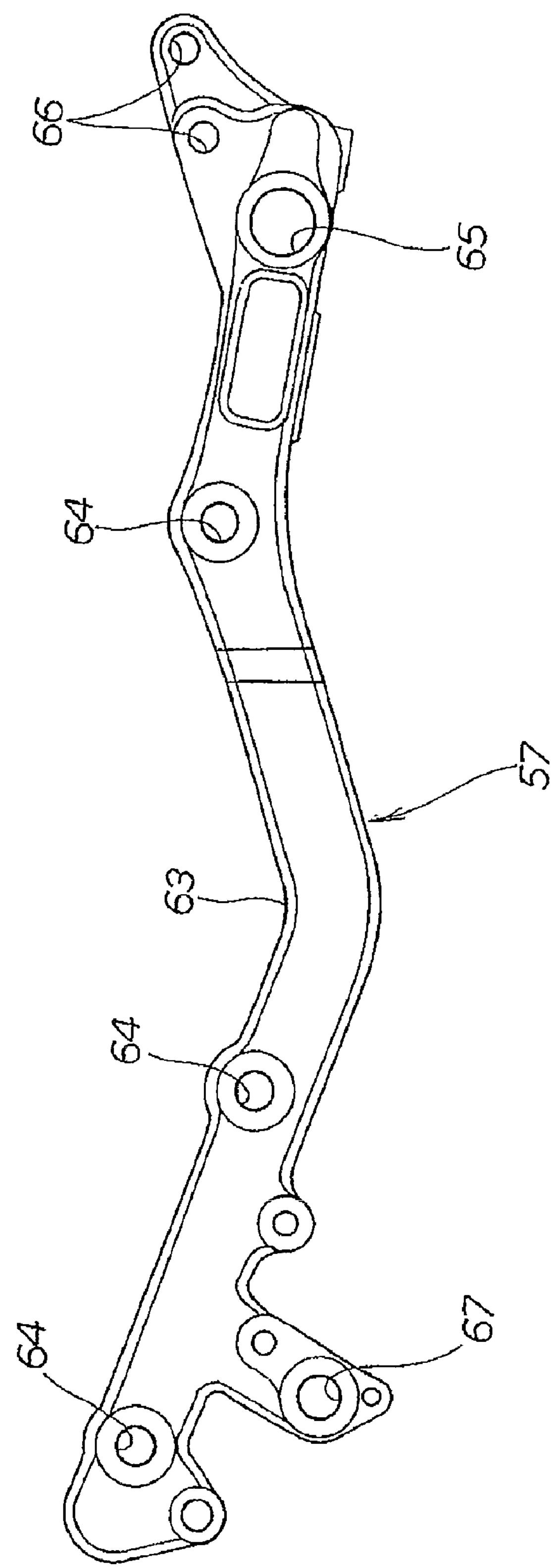
FIG. 7 is a structural view of a lower frame according to the present invention.

As shown in FIG. 7, the lower frame 57 includes a V-shaped portion 63 that is slightly bent into a V shape when being viewed from one side of the vehicle, so as to be kept away from the change pedal 59 in FIG. 6. The lower frame 57 is a lengthy member extending in a front-rear direction of the vehicle and includes a plurality of (three in the example) engine coupling bolt holes 64 and includes a pivot-plate coupling hole 65 and step-bracket attaching holes 66, 66 in a rear part thereof with a rotary-shaft hole 67 in a front part thereof.

The lower frame 57 is coupled to the engine by use of the engine-coupling bolt holes 64.

A step bracket 104 in FIG. 5 is coupled to the lower frame 57 through bolts by use of the step-bracket attaching holes 66, 66.

Figure 10:
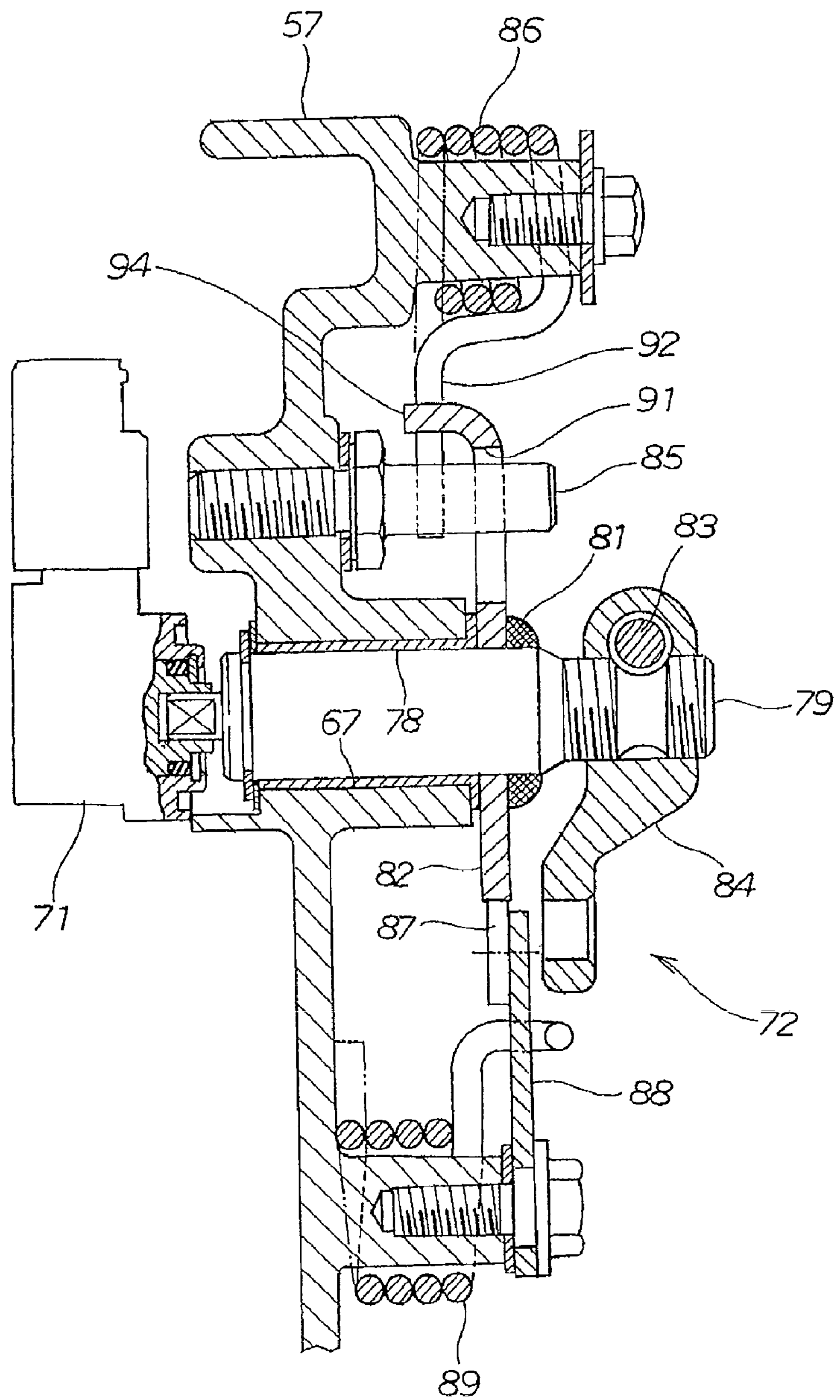
FIG. 10 is a cross-sectional view of the moving member according to the present invention.

A rotary shaft 79 in FIG. 10 is attached to the rotary-shaft hole 67 through a bearing.

The detection mechanism 70 for transmitting an operational instruction to the electric actuator, the gear-shift mechanism 30 in FIG. 5, through a controller (a vehicle-mounted computer) is described.

Figure 8:
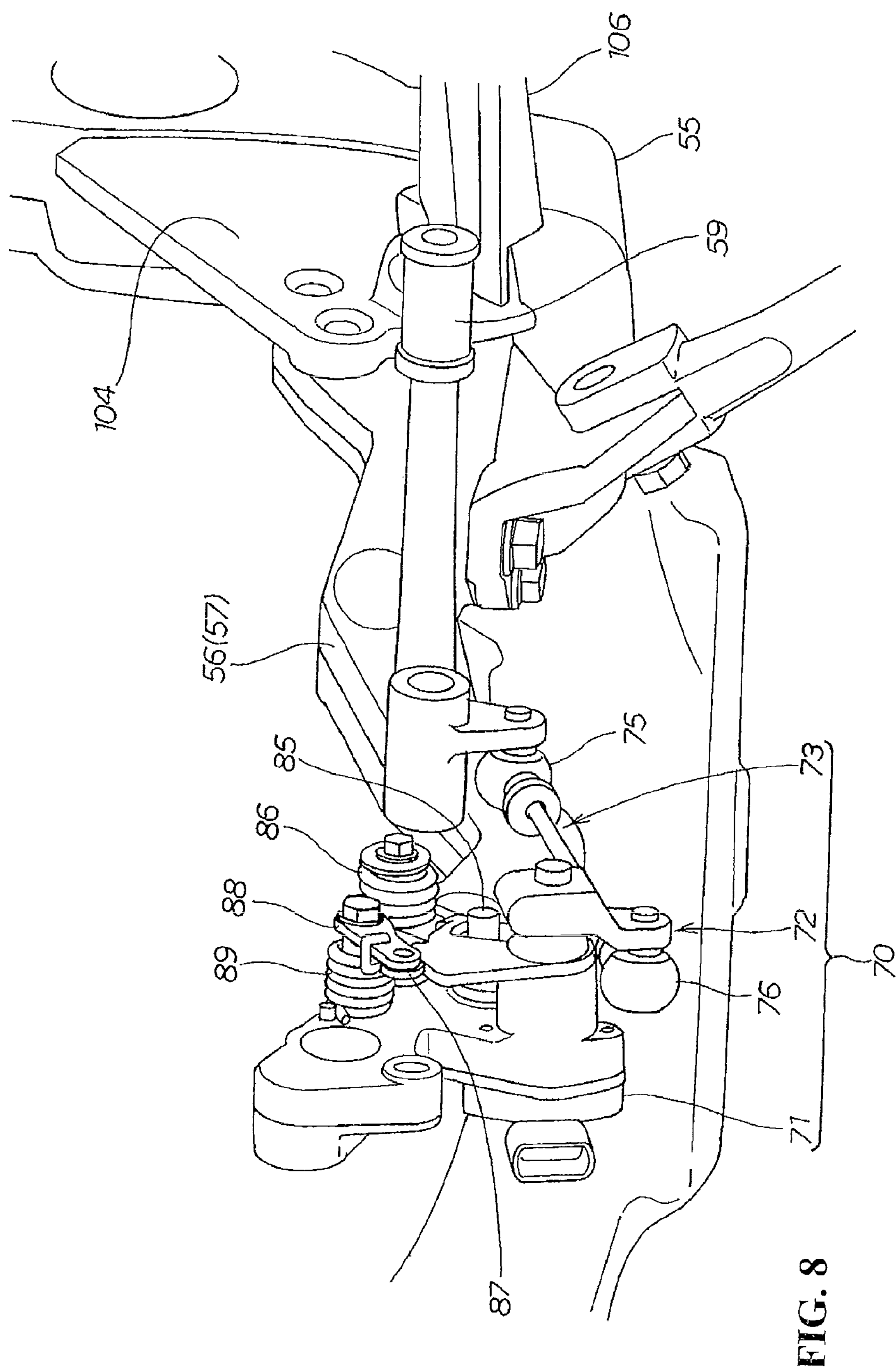
FIG. 8 is a perspective view of a detection mechanism according to the present invention.

As shown in FIG. 8, the detection mechanism 70 is a mechanism for detecting an operation of the change pedal 59, and a main part thereof includes a sensor 71 that generates an electric signal, a moving member 72 that moves a movable portion of the sensor 71, and a coupling member 73 that couples the moving member 72 to the change pedal 59.

Figure 9:
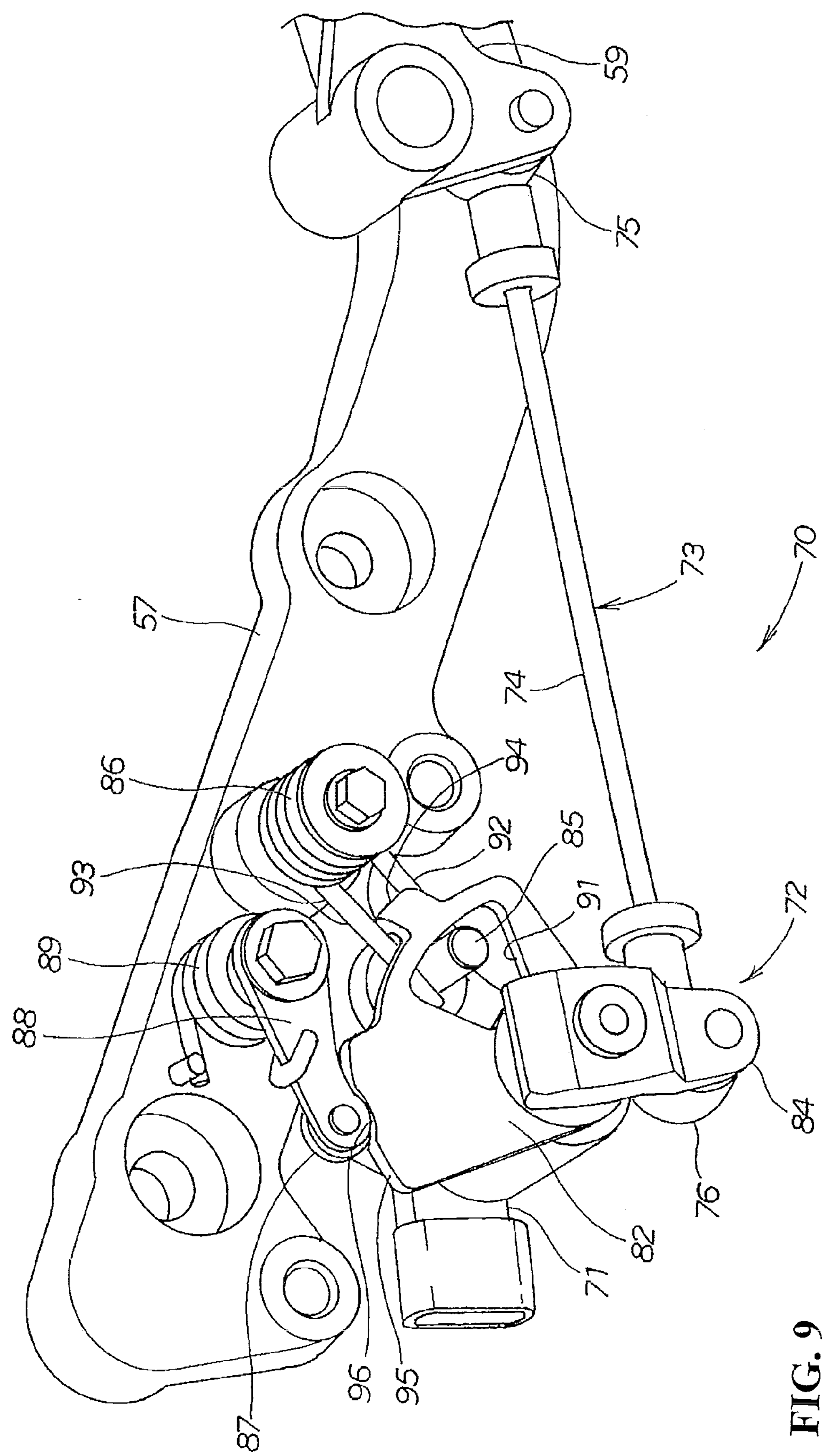
FIG. 9 is a perspective view showing a coupling member and a moving member according to the present invention.

As shown in FIG. 9, the coupling member 73 is composed of a rod 74, a first ball joint 75 provided to one end of the rod 74 and coupled to the change pedal 59, and a second ball joint 76 provided to the other end of the rod 74 and coupled to the moving member 72.

As shown in FIG. 10, a main part of the moving member 72 driven by the above described coupling member 73 includes the rotary shaft 79 rotatably provided to the lower frame 57 through a bearing 78 (any one of a metal bearing, a needle bearing and a ball bearing) as a pivotally supporting portion. A cam plate 82 is fixed through a welded portion 81 to one end of the rotary shaft 79, the one end projecting outward of the vehicle with an arm member 84 detachably attached through a pin or key 83 to the one end of the rotary shaft 79 in a position more outward of the vehicle than the cam plate 82.

With a swing of the arm member 84, the rotary shaft 79 and the cam plate 82 rotate. Furthermore, the lower frame 57 includes a stopper member 85; a neutral spring (neutral-position returning spring) 86; a lever 88 to which a roller 87 is attached; and a biasing spring 89 that unidirectionally pushes the lever 88. These components are described in connection with FIG. 9.

As shown in FIG. 9, the cam plate 82 is fan-shaped, a trapezoidal window 91 is provided in the cam plate 82, and the columnar stopper member 85 is inserted into the window 91. A restricting function of the stopper member 85 restricts a swinging angle of the cam plate 82, whereby the cam plate 82 is prevented from swinging more than necessary.

The stopper member 85 is sandwiched between two leg portions 92 and 93 of the neutral spring 86. In addition, a folded piece 94 of the cam plate 82 is inserted between these two leg portions 92 and 93. Even if the folded end 94 moves leftward or rightward from a position thereof in the drawing, the folded piece 94 is returned to the position in the drawing by a returning function of the leg portions 92 and 93 when an external force thereon disappears or attenuates.

In addition, a recessed portion 96 is provided in the middle of a circular-arc portion 95 of the cam plate 82.

When the driver steps on the change pedal 59, the coupling member 73 exerts a pressing function, whereby the cam plate 83 rotates rightward in the drawing. Thereby, the roller 87 rides on the circular arc portion 95. When the driver releases his or her foot from the change pedal 59, the pressing function of the coupling member 73 disappears, and the cam plate 82 rotates leftward in the drawing by the action of the neutral spring 86. The cam plate 82 stops in a state where the roller 87 is fitted to the recessed portion 96.

When the driver kicks up the change pedal 59, the left and right are reversed, and the cam plate 82 stops likewise in a state where the roller 87 is fitted to the recessed portion 96.

The cam plate 82 stably stops with the roller 87 fitted to the recessed portion 96, whereby a so-called click feel can be obtained on the part of the driver. The click feel is found very close to a click feel in the case of a manual transmission clutch.

In addition, this Example has a configuration in which the roller 87, while rotating, relatively moves smoothly between the circular arc portion 95 and the recessed portion 96, whereby compatible achievement of an appropriate restrictive feel and a smooth pedal-operating feel can be easily achieved.

In addition, as shown in FIG. 10, the sensor 71 is coupled to the other end of the rotary shaft 79 that projects toward the center of the vehicle. As is apparent from the drawing, the sensor 71 is arranged closer to the center of the vehicle than the lower frame 57 is arranged. In other words, the lower frame 57 acts as a protective cover for the sensor 71, the protective cover guarding the sensor 71 against rocks flying toward the sensor 71.

Figure 11:
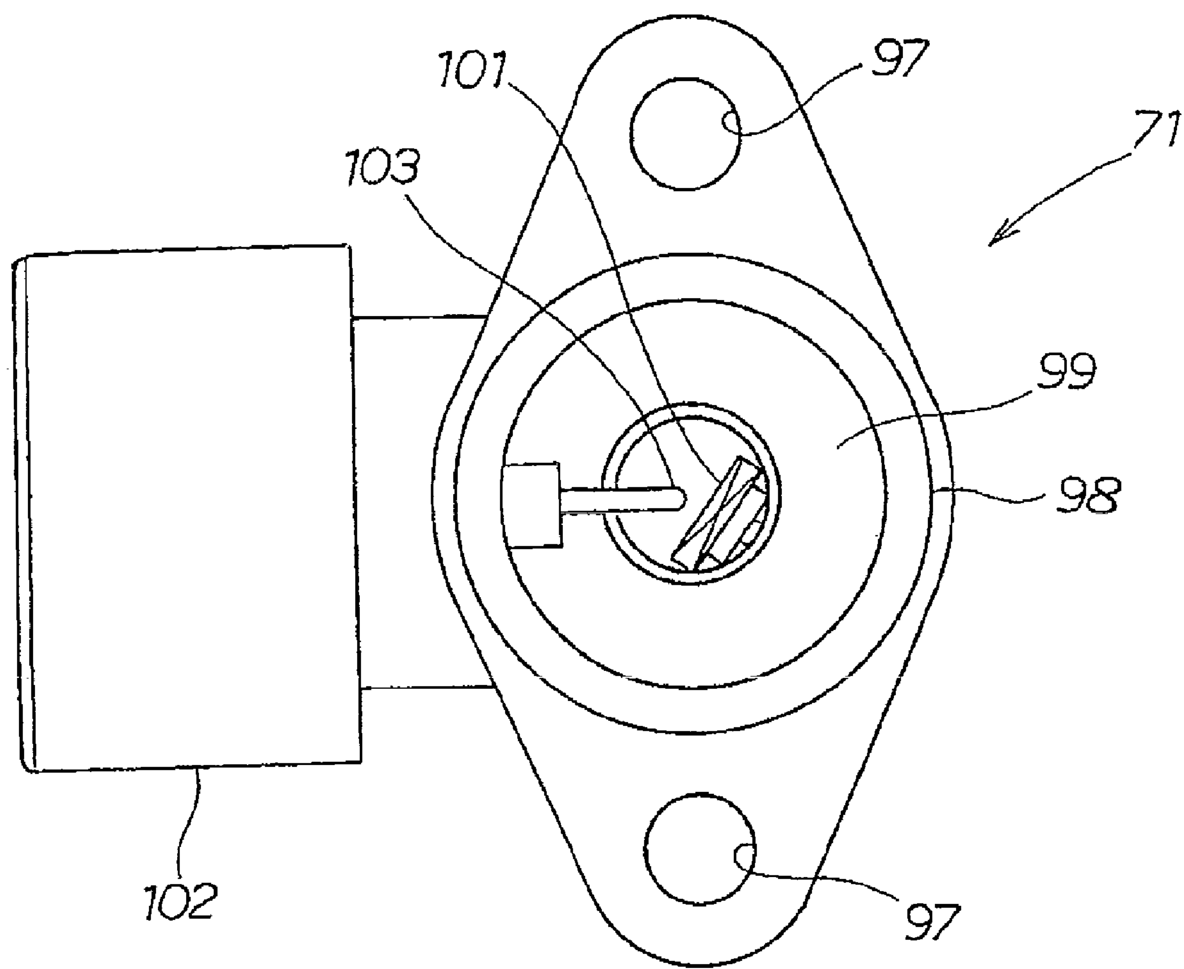
FIG. 11 is a principle view of a non-contact switch according to the present invention.

As shown in FIG. 11, the sensor 71 is composed of a case 98 including bolt holes 97, 97; a rotor 99 rotatably provided to the case 98; a metal piece 101 provided to the rotor 99 so as to be deviated from the center of rotation thereof; and a detection end 103 extending from a terminal opening 102 to the center of the rotation. The metal piece 101 may be a magnet.

The detection end 103 detects an angle on the basis of a change in magnetism, a change in capacitance, and the like, the angle being formed with the metal piece 101. Since the metal piece 101 and the detection end 103 are constantly away from each other, the sensor 71 is referred to as a non-contact switch.

In addition, the sensor 71 may be a contact switch in which a C-shaped junction metal plate is provided to the rotor 99, and a wiper extending from the terminal opening 102 is brought into contact with the junction metal plate so as to detect a rotation angle.

Furthermore, the sensor 71 may use a magnetic rotary potentiometer to continuously detect displacements.

Note that, as compared to a contact switch, a non-contact switch is advantageous in requiring no consideration of wearing. Additionally, as compared to a potentiometer, a non-contact switch provides a benefit in terms of cost reduction.

A positional relation between the above described detection mechanism 70 and the engine 14 is described next.

Figure 12:
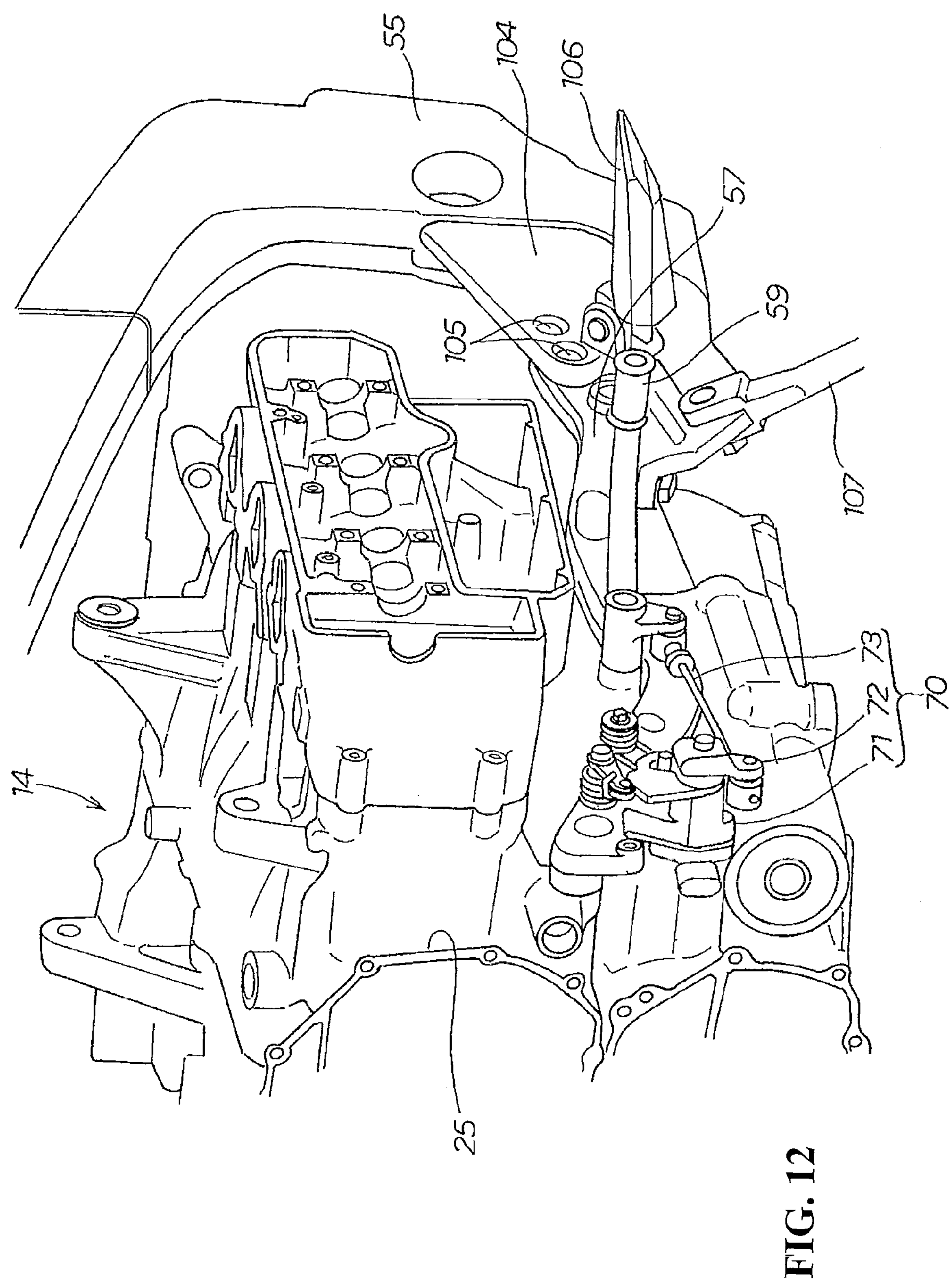
FIG. 12 is a view provided for explaining a relation between the engine and the detection mechanism according to the present invention.

As shown in FIG. 12, the engine 14 includes the crankcase 25 arranged at the center of the vehicle in the vehicle-width direction, and the cylinders 22 arranged between the cylinder heads 26 and the crankcase 25 project from the crankcase 25 leftward and rightward in the vehicle-width direction. The change pedal 59 and the detection mechanism 70 including the sensor 71, the moving member 72 and the coupling member 73, are arranged, under the cylinders and along the crankcase 25, alongside each other in the front-rear direction of the vehicle. This arrangement makes it possible to effectively utilize a dead space under the cylinders 22.

Next, a positional relation of the detection mechanism 70 with the exhaust pipes 15 is described.

Figure 13:
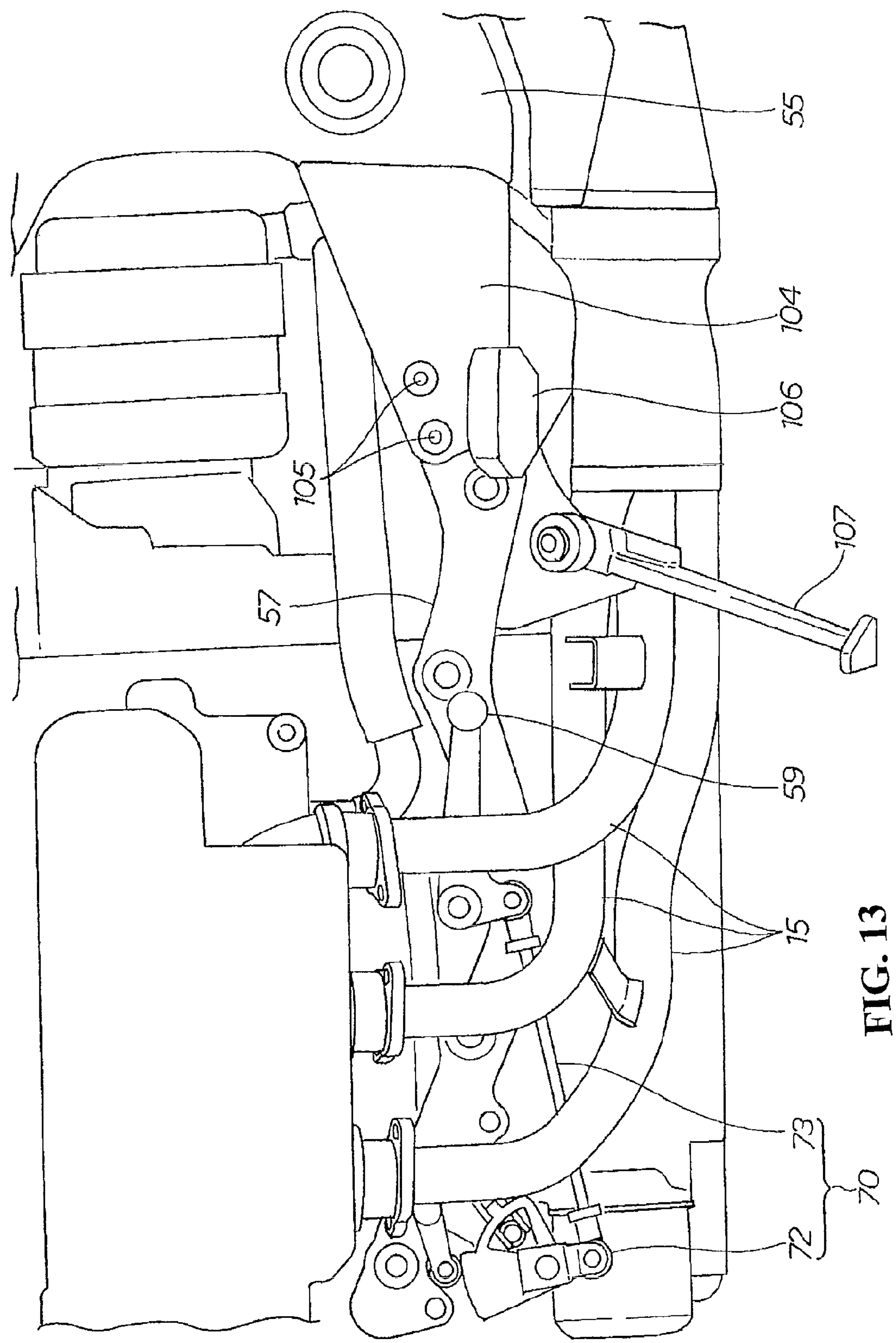
FIG. 13 is a view provided for explaining a relation between exhaust pipes and the detection mechanism according to the present invention.

As shown in FIG. 13, the exhaust pipes 15 connected to the lower faces of the cylinders 22 in FIG. 2 extend downward in the outside of the detection mechanism 70 in the vehicle-width direction (on the front side of the drawing). Since the exhaust pipes 15 exist in the outside of the detection mechanism 70, the exhaust pipes 15 function to protect the detection mechanism 70.

In addition, the step bracket 104 having a trapezoidal shape whose front part is narrower (has a smaller height) and rear part is wider (has a higher height) is attached to a rear end of the lower frame 57 with a bolt 105, and a step 106 on which the driver places his or her foot is attached to the step bracket 104.

As the same time as being a member supporting the step 106, the step bracket 104 acts also as a cover that covers a portion coupling together the rear end of the lower frame 57 and a lower part of the pivot plate 55.

The step bracket 104 can naturally couple together the lower frame 57 and the pivot plate 55, and to improve quality of appearance.

Next, Example 2 of the present invention is described based on the drawings.

Figure 14:
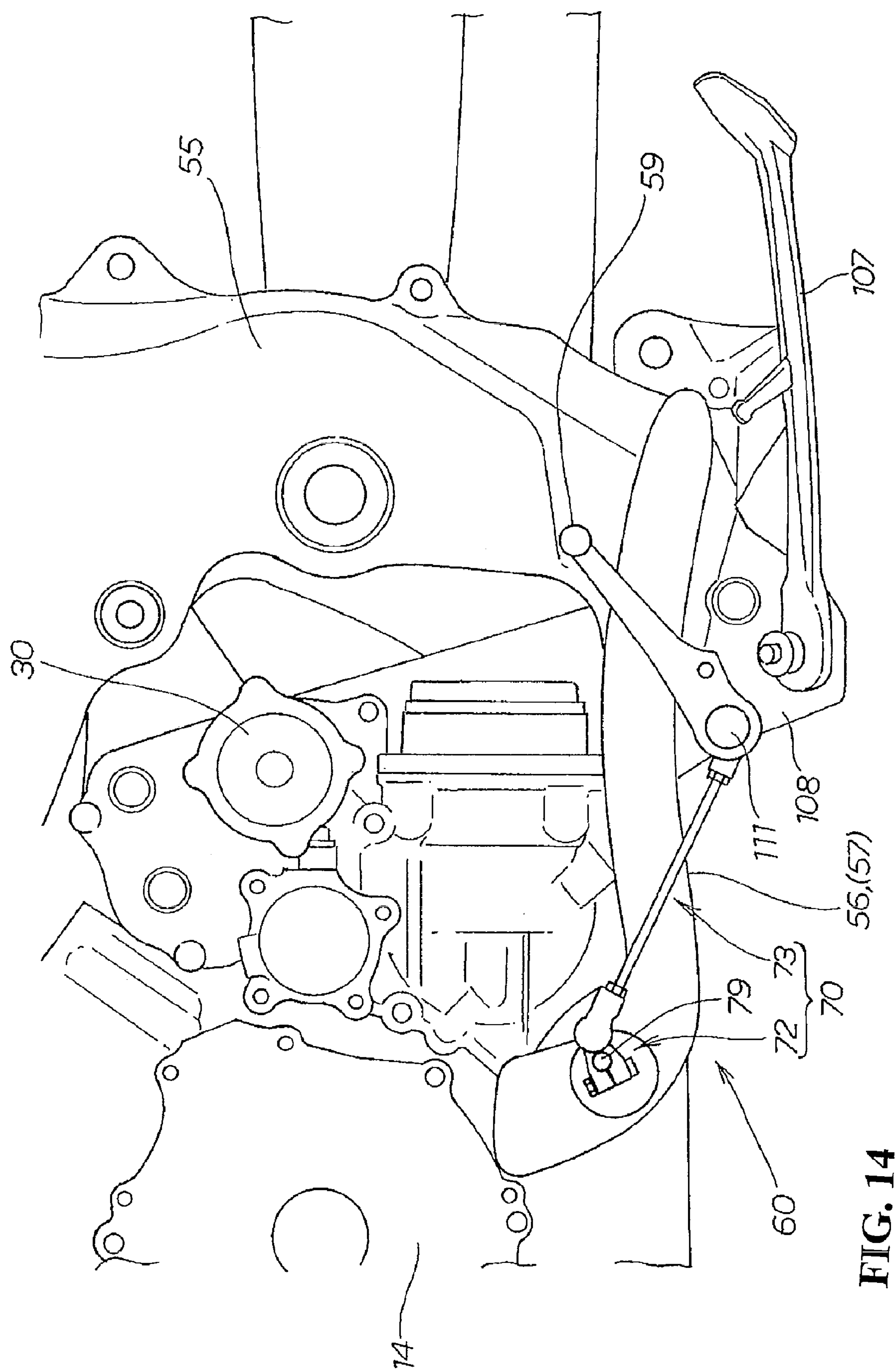
FIG. 14 is a view provided for explaining a second embodiment according to the present invention, and a view provided for explaining a form in which a change pedal is attached to a side stand bracket.

As shown in FIG. 14, the change pedal 59 may be supported by a side stand bracket 108 to which a side stand 107 is attached. Other configurations are the same as in the case of Example 1, and description thereof is omitted.

The change pedal 59 is supported not by the lower frame 57 but by the side stand bracket 108. Thus, a load on the lower frame 57 can be reduced, and size reduction and weight reduction of the lower frame 57 are made possible. In addition, since the side stand bracket 108 is an existing member, an increase in the number of members can be suppressed.

The invention described above can be summed up as follows.

As shown in FIG. 5, in the gear-shift controlling apparatus 60 of the saddle riding type vehicle that includes the engine 14 attached to the main frame 53 and the sub-frame 56 constituting the vehicle body frame 11, and that controls a transmission included in the above described engine 14, the gear-shift controlling apparatus 60 includes the detection mechanism 70 that detects an operation of the change pedal 59, and the gear-shift mechanism 30 that shifts the transmission on the basis of a signal received from the detection mechanism 70. In addition, as shown in FIG. 8, the detection mechanism 70 includes the sensor 71 that generates a signal, the moving member 72 that moves the movable portion (the rotor 99 in FIG. 11) of the sensor 71, and the coupling member 73 that couples the moving member 72 to the change pedal 59. At the same time, the change pedal 59, the coupling member 73, the moving member 72 and the sensor 71 are arranged sequentially alongside one another along the sub-frame 56.

The sub-frame 56 is an existing member constituting a part of the vehicle body frame 11. In other words, base plates exclusively for the moving member 72, the sensor 71 and the like can be eliminated. As a result, a procurement cost and an attachment cost for members can be easily reduced. In addition, by having the components arranged along the sub-frame 56, a length reduction of the coupling member 73 is also made possible.

Next, Example 3 of the present invention is described based on the drawings.

Here, described is a specific example in which the sensor 71 is arranged closer to the gear-shift mechanism 30 than the change pedal 59 is arranged.

Figure 15:
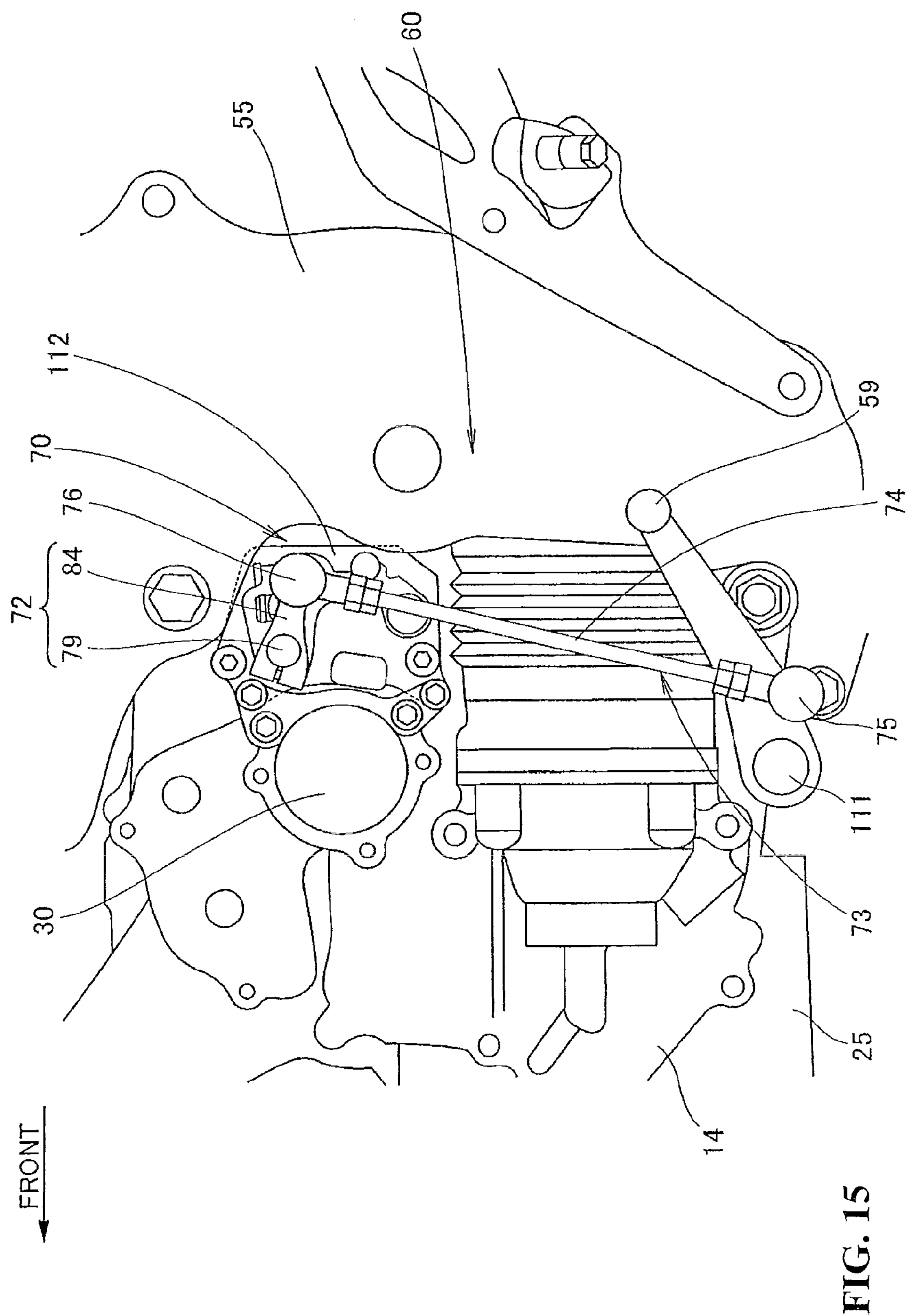
FIG. 15 is a view provided for explaining a third embodiment according to the present invention.

As shown in FIG. 15, the change pedal 59 is attached to the crankcase 25 through a spindle 111; the first ball joint 75 of the coupling member 73 is coupled to the change pedal 59; the rod 74 extends obliquely upward from the first ball joint 75, and then coupled to the arm member 84 of the moving member 72 through the second ball joint 76; and the rotary shaft 79 is coupled to the arm member 84.

An arrow indicated by a word "FRONT" shows a frontward direction of the vehicle. The gear-shift mechanism 30 is arranged more frontward of the vehicle than the moving member 72.

Figure 16:
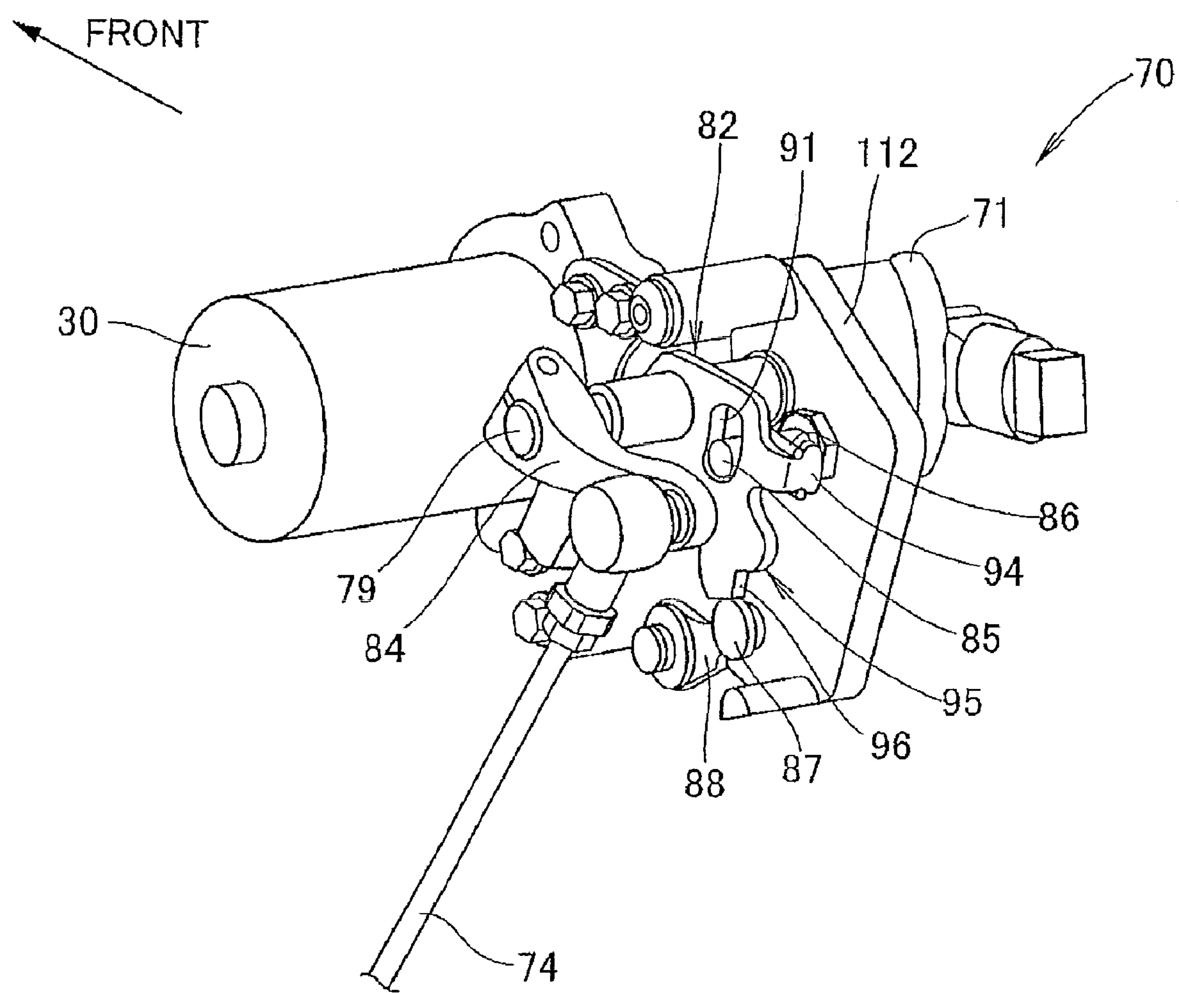
FIG. 16 is a perspective view of a main part of FIG. 15.

In addition, as shown in FIG. 16, the rotary shaft 79 is rotatably supported by a base plate 112 doubling as a click-feel generating plate; at the same time, the cam plate 82 is provided to the rotary shaft 79; the columnar stopper member 85, which is raised from the base plate 112, penetrates the window 91 provided in the cam plate 82; the neutral spring 86, which retains in a neutral position the folded piece 94 folded from the cam plate 82, is provided to the base plate 112; and the lever 88, which supports the roller 87 making contact with the circular arc portion 95 and the recessed portion 96, is provided to the base plate 112.

In addition, the gear-shift mechanism 30 is provided in a space outward from the base plate 112 of the vehicle, and the sensor 71 is provided to the vehicle-center side of the base plate 112.

More specifically, as shown in FIG. 15, in the gear-shift controlling apparatus 60 of the saddle riding type vehicle which controls a transmission of the engine 14 included in the saddle riding type vehicle, the gear-shift controlling apparatus 60 includes the detection mechanism 70 (whose main part is the movable portion 72 and the coupling portion 73) that detects an operation of the change pedal 59, and the gear-shift mechanism 30 that shifts the transmission on the basis of a signal received from the detection mechanism 70. In addition, the detection mechanism 70 includes, as shown in FIGS. 15 and 16, the sensor 71 that generates a signal, the moving member 72 that moves the movable portion of the sensor 71, and the coupling member 73 that couples the moving member 72 to the change pedal 59; at the same time, the change pedal 59, the coupling member 73, the moving member 72 and the sensor 71 are arranged sequentially alongside one another.

In addition, in FIG. 15, the sensor 71 arranged behind the rotary shaft 79 is arranged closer to the gear-shift mechanism 30 than the change pedal 59 is arranged.

Thus, a distance between the sensor 71 and the gear-shift mechanism 30 is shortened. As a result, a harness extending from the controller can integrally extend even to the sensor 71 and to the gear-shift mechanism 30, whereby the harness can be shortened while an attachment cost of the harness can be lowered.

Note that the gear-shift controlling apparatus of the present invention is applicable to a saddle riding type vehicle such as a motorcycle, three-wheeled buggy, a four-wheeled buggy and the like.

The gear-shift controlling apparatus of the present invention is suitable for use in a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gear-shift controlling apparatus for a saddle riding vehicle for controlling a transmission connected to an engine attached to a vehicle body frame of the saddle riding vehicle, the gear-shift controlling apparatus comprising:

a detection mechanism for detecting an operation of a change pedal; and a gear-shift mechanism for shifting the transmission on the basis of a signal received from the detection mechanism, wherein the detection mechanism comprises a sensor for generating the signal, a moving member for moving a movable portion of the sensor, and a coupling member for coupling the moving member to the change pedal, the change pedal, the coupling member, the moving member and the sensor are arranged sequentially alongside one another along a member constituting the vehicle body frame;

the vehicle body frame includes a head pipe, a main frame extending rearwardly from the head pipe, and a pivot plate extending from a rear portion of the main frame and supporting a front end of a rear swing arm supporting a rear wheel, and a lower frame serving as a sub-frame extends from the pivot table toward the front of the vehicle.

2. The gear-shift controlling apparatus for a saddle riding vehicle according to claim 1, wherein the change pedal is supported by the engine.

3. The gear-shift controlling apparatus for a saddle riding vehicle according to claim 1, wherein the change pedal is supported by a side stand bracket to which a side stand is attached.

4. The gear-shift controlling apparatus for a saddle riding vehicle according to claim 1, wherein the sensor is a non-contact switch.

5. A gear-shift controlling apparatus for a saddle riding vehicle for controlling a transmission connected to an engine attached to a main frame and a sub-frame constituting a vehicle body frame of the saddle riding vehicle, the gear-shift controlling apparatus comprising:

a detection mechanism for detecting an operation of a change pedal; and a gear-shift mechanism for shifting the transmission on the basis of a signal received from the detection mechanism, wherein the detection mechanism comprises a sensor for generating the signal, a moving member for moving a movable portion of the sensor, and a coupling member for coupling the moving member to the change pedal, and the change pedal, the coupling member, the moving member and the sensor are arranged alongside one another in a longitudinal direction of the sub-frame and said change pedal being supported by the engine.

6. The gear-shift controlling apparatus for a saddle riding vehicle according to claim 5, wherein the moving member is movably attached to the sub-frame.

7. The gear-shift controlling apparatus for a saddle riding vehicle according to claim 6, wherein the moving member includes an arm member that swings about one end thereof, and a pivotally supporting portion of the arm member is connected to the sub-frame.

8. The gear-shift controlling apparatus for a saddle riding vehicle according to claim 7, wherein a rotary shaft is attached to the sub-frame with a bearing interposed therebetween, one end of the rotary shaft projects from the sub-frame toward an outside of the vehicle, the arm member is attached to the projecting one end, the other end of the rotary shaft projects from the sub-frame toward the center of the vehicle, and the sensor is attached to the projecting other end.

9. The gear-shift controlling apparatus for a saddle riding vehicle according to claim 6, wherein the vehicle body frame includes a head pipe, a main frame extending rearwardly from the head pipe, and a pivot plate extending from a rear portion of the main frame and supporting a front end of a rear swing arm supporting a rear wheel, and a lower frame serving as the sub-frame extends from the pivot plate toward the front of the vehicle.

10. The gear-shift controlling apparatus for a saddle riding vehicle according to claim 5, wherein the moving member includes an arm member that swings about one end thereof, and a pivotally supporting portion of the arm member is connected to the sub-frame.

11. The gear-shift controlling apparatus for a saddle riding vehicle according to claim 10, wherein a rotary shaft is attached to the sub-frame with a bearing interposed therebetween, one end of the rotary shaft projects from the sub-frame toward an outside of the vehicle, the arm member is attached to the projecting one end, the other end of the rotary shaft projects from the sub-frame toward the center of the vehicle, and the sensor is attached to the projecting other end.

12. The gear-shift controlling apparatus for a saddle riding vehicle according to claim 5, wherein the vehicle body frame includes a head pipe, a main frame extending rearwardly from the head pipe, and a pivot plate extending from a rear portion of the main frame and supporting a front end of a rear swing arm supporting a rear wheel, and a lower frame serving as the sub-frame extends from the pivot plate toward the front of the vehicle.

13. The gear-shift controlling apparatus for a saddle riding vehicle according to claim 5, wherein the sensor is a non-contact switch.

14. A gear-shift controlling apparatus for a saddle riding vehicle for controlling a transmission of an engine for the saddle riding vehicle, the gear-shift controlling apparatus comprising:

a detection mechanism for detecting an operation of a change pedal; and a gear-shift mechanism for shifting the transmission on the basis of a signal received from the detection mechanism, wherein the detection mechanism comprises a sensor for generating the signal, a moving member for moving a movable portion of the sensor, and a coupling member for coupling the moving member to the change pedal, and the change pedal, the coupling member, the moving member and the sensor are arranged, under the engine, alongside one another in a front-rear direction of the vehicle and said change pedal being supported by the engine.

15. The gear-shift controlling apparatus for a saddle riding vehicle according to claim 14, wherein the engine comprises a crankcase arranged at the center in the vehicle-width direction, and cylinders projecting from the crankcase leftward and rightward in the vehicle-width direction, and the change pedal, the coupling member, the moving member and the sensor are arranged, under the cylinders, alongside one another along the crankcase in the front-rear direction of the vehicle.

16. The gear-shift controlling apparatus for a saddle riding vehicle according to claim 15, wherein exhaust pipes connected to lower faces of the cylinders extend downward in an outside of the detection mechanism in the vehicle-width direction.

17. A gear-shift controlling apparatus for a saddle riding vehicle for controlling a transmission of an engine for the saddle riding vehicle, the gear-shift controlling apparatus comprising:

a detection mechanism for detecting an operation of a change pedal; and a gear-shift mechanism for shifting the transmission on the basis of a signal received from the detection mechanism, wherein the detection mechanism comprises a sensor for generating the signal, a moving member for moving a movable portion of the sensor, and a coupling member for coupling the moving member to the change pedal, and the change pedal, the coupling member, the moving member and the sensor are arranged sequentially alongside one another and said change pedal being supported by the engine, and the sensor is arranged closer to the gear-shift mechanism than the change pedal.

* * * * *